US010860804B2

(12) United States Patent
Pasternack

(10) Patent No.: US 10,860,804 B2
(45) Date of Patent: Dec. 8, 2020

(54) QUICK TEXT CLASSIFICATION MODEL

(71) Applicant: Microsoft Technology Licensing, LLC, Redmond, WA (US)

(72) Inventor: Jeffrey William Pasternack, Belmont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 15/980,881

(22) Filed: May 16, 2018

(65) Prior Publication Data
US 2019/0354586 A1 Nov. 21, 2019

(51) Int. Cl.
*G06F 40/30* (2020.01)
*G06N 20/00* (2019.01)

(52) U.S. Cl.
CPC ............ *G06F 40/30* (2020.01); *G06N 20/00* (2019.01)

(58) Field of Classification Search
CPC ............................... G06F 40/30; G06N 20/00
USPC ............................................................ 704/9
See application file for complete search history.

(56) References Cited

U.S. PATENT DOCUMENTS

| 9,298,726 | B1 | 3/2016 | Mondal et al. |
| 10,599,774 | B1 * | 3/2020 | Luo ..................... G06F 40/30 |
| 2006/0106746 | A1 | 5/2006 | Stuhec |
| 2007/0124132 | A1 | 5/2007 | Takeuchi |
| 2009/0282114 | A1 | 11/2009 | Feng et al. |
| 2010/0185577 | A1 * | 7/2010 | Tsaparas ................ G06N 20/00 706/52 |
| 2010/0287049 | A1 | 11/2010 | Rousso et al. |
| 2014/0019117 | A1 | 1/2014 | Ravi et al. |
| 2014/0035823 | A1 | 2/2014 | Khoe et al. |
| 2014/0039874 | A1 | 2/2014 | Pelosi |
| 2015/0286627 | A1 * | 10/2015 | Chang ................... G06F 40/205 704/9 |
| 2016/0110340 | A1 | 4/2016 | Bojja et al. |
| 2017/0147575 | A1 * | 5/2017 | Pappu ................. G06F 16/9014 |
| 2017/0200077 | A1 * | 7/2017 | Weston ................ G06F 40/279 |

(Continued)

OTHER PUBLICATIONS

"Final Office Action Issued in U.S. Appl. No. 15/994,922", dated Mar. 23, 2020, 15 Pages.

(Continued)

*Primary Examiner* — Edwin S Leland, III
(74) *Attorney, Agent, or Firm* — Schwegman Lundberg & Woessner, P.A.

(57) ABSTRACT

Disclosed are systems, methods, and non-transitory computer-readable media for an improved text classification model. A text classification system determines a first embedding for a first set of characters in a text, and a second embedding for a second set of characters in the text. The text classification system applies a first coefficient to the first embedding and a second coefficient to the second embedding, yielding a first weighted embedding and a second weighted embedding. The first coefficient is different than the second coefficient. The text classification system determines a weighted average embedding for the text based on the first weighted embedding, the second weighted embedding, the first coefficient and the second coefficient. The text classification system identifies at least a first classification label and a second classification label for the text based on the weighted average embedding for the text.

20 Claims, 9 Drawing Sheets

(56) References Cited

U.S. PATENT DOCUMENTS

| | | | |
|---|---|---|---|
| 2017/0315984 A1* | 11/2017 | Goyal | G06F 40/205 |
| 2018/0095624 A1 | 4/2018 | Osman et al. | |
| 2018/0210874 A1 | 7/2018 | Fuxman et al. | |
| 2019/0065458 A1 | 2/2019 | Brunet et al. | |
| 2019/0156210 A1* | 5/2019 | He | G06N 3/0427 |
| 2019/0171913 A1* | 6/2019 | Cheng | G06N 5/003 |
| 2019/0188277 A1* | 6/2019 | Mansar | G06F 16/353 |
| 2019/0287685 A1* | 9/2019 | Wu | G06N 3/0445 |
| 2019/0372923 A1 | 12/2019 | Pasternack | |
| 2020/0050667 A1* | 2/2020 | Lin | G06F 40/30 |
| 2020/0076825 A1* | 3/2020 | Vallur | H04L 63/1458 |

OTHER PUBLICATIONS

"Non Final Office Action Issued in U.S. Appl. No. 15/994,922", dated Dec. 18, 2019, 15 Pages.

"Non Final Office Action Issued in U.S. Appl. No. 15/994,922", dated Jun. 19, 2020, 16 Pages.

"Notice of Allowance Issued in U.S. Appl. No. 15/994,922", dated Sep. 14, 2020, 14 Pages.

* cited by examiner

QUICK TEXT CLASSIFICATION MODEL

TECHNICAL FIELD

An embodiment of the present subject matter relates generally to text classification and, more specifically, to an improved text classification model.

BACKGROUND

Text classification models are used to classify text. For example, text classification can be used to assign documents (such as emails, posts, text messages, product reviews, etc.) to one or multiple categories. Likewise, text classification can be used to assign a meaning or intent to the text, or to determine recommended responses to the text. Text classification models generally assign values to words in the text, which are used to determine an overall value for the text. For example, the overall value may be the average of the individual values of the words. The overall value for the text is then used to identify appropriate classification tags for the text. One drawback of these models is that each word if given equal weight when determining the overall value for the text. As a result, common words (e.g., transition words, articles, etc.) that provide little to no insight into the meaning of the text are given equal weight to other words that provide greater insight into the text. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
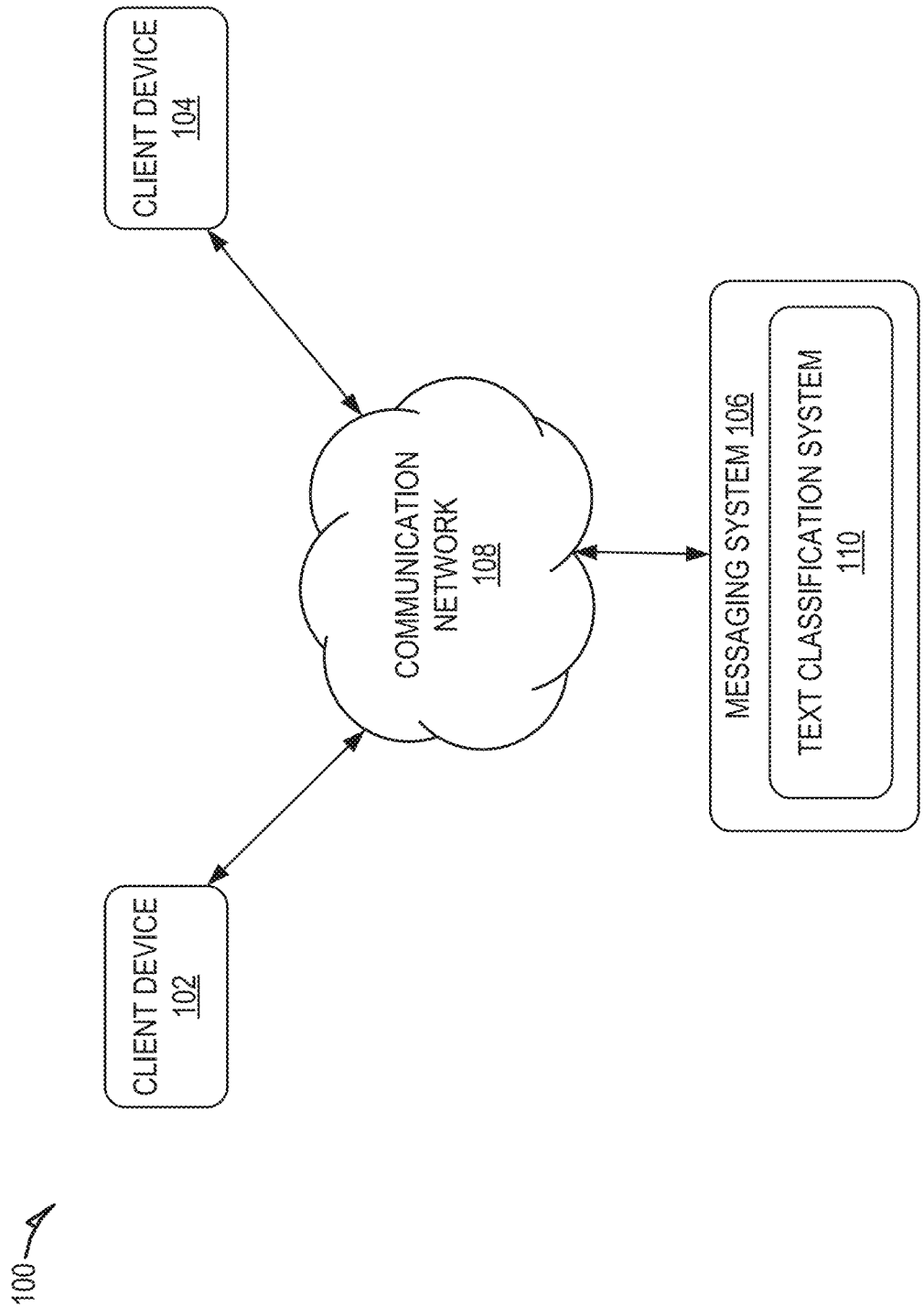
FIG. 1 shows a system, wherein an improved text classification model is used to generate recommended responses to messages received as part of a communication session, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for an improved text classification model. A text classification system classifies a set of text based on embeddings (i.e., word embeddings) associated with sets of characters in the text. An embedding is a value, set of values, vector, etc., that is mapped to a set of characters. The set of characters may be of any size. For example, the set of characters may be a set of characters separated from other sets of characters by a space (e.g., individual words in the text). As another example, the set of characters may be a fixed number of continuous characters, such as two continuous characters.

The text classification system identifies sets of characters in the text and determines an embedding for each set of characters. That is, the text classification system identifies the value, set of values, vector, etc., that is mapped to the set of characters. The text classification system applies a coefficient to each determined embedding. The coefficient is a value, set of values, vector, etc., that provides a weight to the embedding based on the perceived value of the set of characters to the meaning of the text. For example, common words, such as articles (e.g., a, an, the, etc.), that provide little insight into the meaning of a text are assigned lower coefficients (e.g., below one), whereas words that are relatively rare and may provide greater insight into the meaning of a text are assigned higher coefficients (e.g., greater than one). The text classification system applies the coefficient by multiplying the embedding and the coefficient, resulting in a set of weighted coefficients for the text.

The coefficients can be learned by the text classification model, derived from another existing model that measures the significance of each work (e.g. use the norm [length] of the embeddings trained in a Word2Vec model), or derived from a heuristic, such as inverse document frequency. When learned by the text classification model, the coefficients can also be regularized, that is, incorporated into the loss function to discourage text classification model from making them too large or too small, or to encourage sparsity (e.g. L1-regularization), or both.

The text classification system calculates a weighted average embedding for the text based on the set of weighted embeddings and the coefficients. For example, the text classification system calculates the weighted average embedding for the text by dividing the sum of the weighted average embeddings by the sum of the coefficients. The text classification system uses the resulting weighted average embedding for the text to identify classification labels that classify the text.

As explained, the embeddings for each set of characters may be a feature vector that represents its corresponding set of characters. Each feature vector is comprised of a set of vector values for each feature of the vector. The coefficient applied to the vectors may also be a vector including a set of vector values. This allows the coefficient to apply varying weights to the different vector values of the vector based on the corresponding feature. As a result, specific features of the vector may be weighted differently based on their perceived value to properly classifying the text.

The improved text classification model provided by the text classification system may be used for a variety of uses. For example, the text classification system may be used to provide recommended responses to messages transmitted as part of a communication session between users. In this type of embodiments, the text classification system uses the weighted average embedding for a text to identify classification labels that identify a set of likely responses to the text.

FIG. 1 shows a system 100, wherein an improved text classification model is used to generate recommended responses to messages received as part of a communication session, according to some example embodiments. Although the improved text classification model is described in the context of message recommendations, this is only one example, and is not meant to be limiting. The improved text classification model can be used for any use of text classification, and this disclosure contemplates all such embodiments.

As shown, multiple devices (i.e., client device 102, client device 104, and a messaging system 106) are connected to a communication network 108 and configured to communicate with each other through use of the communication network 108. The communication network 108 is any type of network, including a local area network (LAN), such as an intranet, a wide area network (WAN), such as the internet, or any combination thereof. Further, the communication network 108 may be a public network, a private network, or a combination thereof. The communication network 108 is implemented using any number of communications links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, etc., from another computing device in network communication with the computing device and pass the communication along to an appropriate module running on the computing device. The communication interface also sends a communication to another computing device in network communication with the computing device.

In the system 100, users interact with the messaging system 106 to establish and participate in communication sessions with other users. For example, users use the client devices 102 and 104 that are connected to the communication network 108 by direct and/or indirect communication to communicate with and utilize the functionality of the messaging system 106. Although the shown system 100 includes only two client devices 102, 104, this is only for ease of explanation and is not meant to be limiting. One skilled in the art would appreciate that the system 100 can include any number of client devices 102, 104. Further, the messaging system 106 may concurrently accept connections from and interact with any number of client devices 102, 104. The messaging system 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, etc.

A user interacts with the messaging system 106 via a client-side application installed on the client devices 102 and 104. In some embodiments, the client-side application includes a messaging system specific component. For example, the component may be a stand-alone application, one or more application plug-ins, and/or a browser extension. However, the users may also interact with the messaging system 106 via a third-party application, such as a web browser, that resides on the client devices 102 and 104 and is configured to communicate with the messaging system 106. In either case, the client-side application presents a user interface (UI) for the user to interact with the messaging system 106. For example, the user interacts with the messaging system 106 via a client-side application integrated with the file system or via a webpage displayed using a web browser application.

The messaging system 106 is one or more computing devices configured to facilitate and manage communication sessions between various client devices 102, 104. The messaging system 106 can be a standalone system or integrated into other systems or services, such as being integrated into an online service 108, such as a social networking service, new service, etc. In either case, the messaging system 106 facilitates a communication session between client devices 102 and 104, where a user participant using one client device 102 can send and receive messages with a user participant using the other client device 104.

The messaging system 106 enables a user to initiate a communication session by providing a messaging interface where the user can select other users to include in the communication session, draft messages to be transmitted to the selected other users as part of a communication session, and read messages received from the other users as part of the communication sessions. Messages transmitted by a user's client device 102 as part of a communication session are received by the messaging system 106, which forwards the message to the recipient user's client device 104. The messaging system 106 can also store the received messages along with metadata describing the messages, such as the time the messages were sent, the originating user of the message, the recipient of the message, etc.

The messaging system 106 includes a text classification system 110 that enables the messaging system to generate and provides users with recommended responses based on historical message data and user profile data. The historical message data includes messages that were transmitted between client devices 102, 104 as part of previous communication sessions, as well as an order in which the messages were sent. The text classification system 110 uses the historical message data to generate a text classification model, which is used to determine recommended responses based on a received message. For example, upon receiving a message from client device 102 that is intended for client device 104 as part of a communication session, the text classification system 110 uses the received message as input in the text classification model, which results in a set of candidate responses to the message. The text classification system 110 then selects a set of recommended responses from the set of candidate responses and the messaging system 106 transmits the set of recommended responses along with the received message to client device 104 as part of the communication session.

The user of client device 104 can use the provided recommended responses to quickly and easily provide a response to the received message. For example, the user of client device 104 can provide a single input (e.g., tapping one of the recommended responses) to provide a response to the user of client device 102, rather than typing out a reply message letter by letter and then selecting to send the message. Upon receiving a user selection of one of the recommended responses from client device 104, the messaging system 106 transmits the recommended response to client device 102 as part of the communication session. Additionally, the messaging system 106 may generate and provide client device 102 with a set of recommended responses.

In contrast to previous text classification models that assign equal value to each set of characters (e.g., word) in a text, the text classification model generated by the text classification system 110 uses coefficients to appropriately weight the sets of characters in the input message. The text classification model initially determines an embedding for each set of characters in the text. That is, the text classification model identifies the value, set of values, vector, etc., that is mapped to the set of characters. The text classification model then applies a coefficient to each determined embedding. The coefficient is a value, set of values, vector, etc., that provides a weight to the embedding based on the perceived value of the set of characters to the meaning of the text. For example, common words, such as articles (e.g., a, an, the, etc.), that provide little insight into the meaning of a text are assigned lower coefficients (e.g., below one), whereas words that are relatively rare and may provide greater insight into the meaning of a text are assigned higher coefficients (e.g., greater than one). The coefficient is applied by multiplying the embedding and the coefficient, resulting in a set of weighted coefficients for the text.

The coefficients can be learned by the text classification model, derived from another existing model that measures the significance of each work (e.g. use the norm [length] of the embeddings trained in a Word2Vec model), or derived from a heuristic, such as inverse document frequency. When learned by the text classification model, the coefficients can also be regularized, that is, incorporated into the loss function to discourage text classification model from making them too large or too small, or to encourage sparsity (e.g. L1-regularization), or both.

The text classification model calculates a weighted average embedding for the text based on the set of weighted embeddings and the coefficients. For example, the text classification model calculates the weighted average embedding for the text by dividing the sum of the weighted average embeddings by the sum of the coefficients. The text classification model uses the resulting weighted average embedding for the text to identify classification labels that classify the text.

As explained, the embeddings for each set of characters may be a feature vector that represents its corresponding set of characters. Each feature vector is comprised of a set of vector values for each feature of the vector. The coefficient applied to the vectors may also be a vector including a set of vector values. This allows the coefficient to apply varying weights to the different vector values of the vector based on the corresponding feature. As a result, specific features of the vector may be weighted differently based on their perceived value to properly classifying the text.

Figure 2:
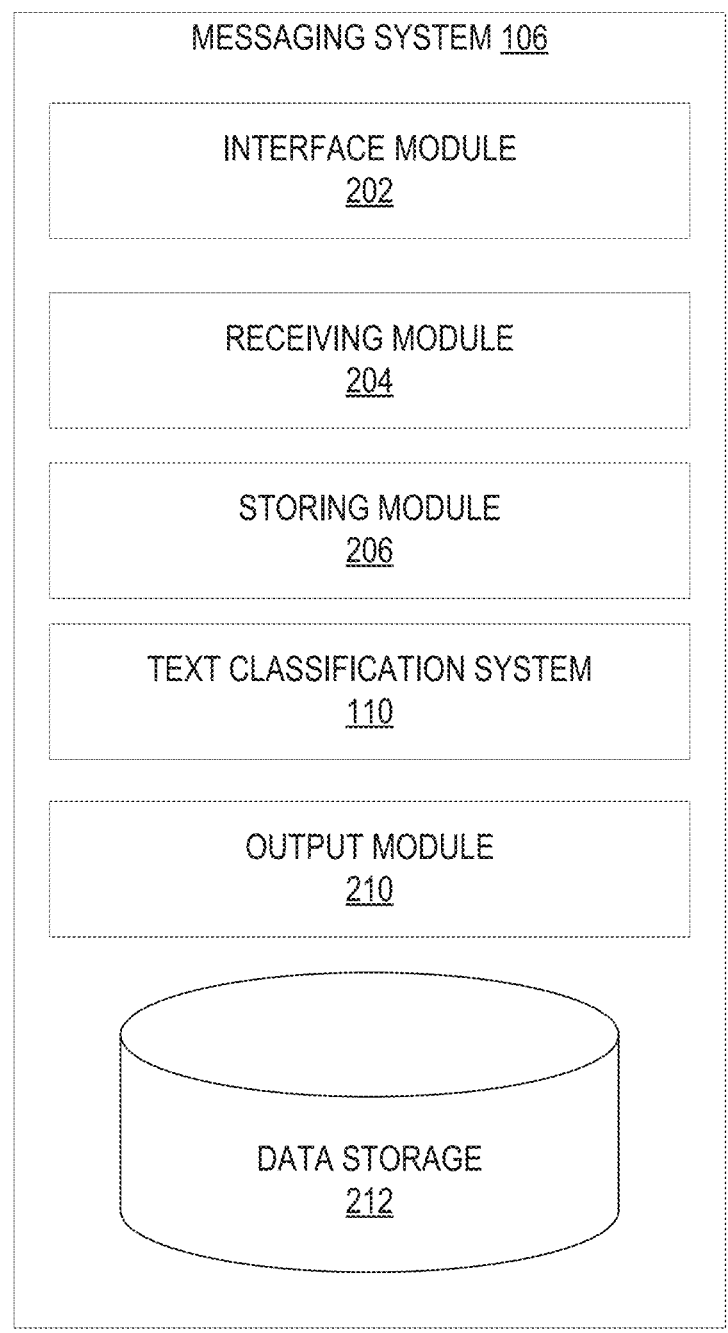
FIG. 2 is a block diagram of the messaging system, according to some example embodiments.

FIG. 2 is a block diagram of the messaging system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the messaging system 106 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the messaging system 106 includes an interface module 202, a receiving module 204, a storing module 206, a text classification system 110, an output module 210, and a data storage 212. The interface module 202 provides a messaging interface that enables users to initiate and participate in communication sessions with other users. For example, the messaging interface includes user interface elements (e.g., buttons, scrollbars, text fields, etc.) that enable a user to select users and draft messages to initiate and participate in a communication session. Further, the messaging interface presents the users with a listing of available contacts to include in a communication session. The messaging interface also presents the user with a listing of existing communication sessions, which a user can select from to read the previous messages transmitted as part of the communication session as well as to draft and send new messages as part of the communication session.

The receiving module 204 receives messages that are being transmitted as part of a communication session. The messages are received from the client device 102, 104 of an originating user and intended for one or more other client devices 102, 104 of recipient users in the communication session. For example, a user may use the client device 102 to generate and transmit a message to the client device 104 of another user as part of a communication session. The message is initially received by the receiving module 204 of the messaging system 106. The received messages may include metadata, such as a timestamp indicating the time at which the message was transmitted, identifiers identifying the source and/or destination client devices 102, 104, an identifier identifying the communication session, etc.

The storing module 206 stores message data consisting of the received messages along with associated metadata in the data storage 212. In some embodiments, the storing module 206 anonymizes the message data to protect the privacy of the users. For example, the storing module 206 removes names and other personal information from the message data. The storing module 206 may also store the message data for a limited period of time, after which the message data is deleted. In some embodiments, a user is allowed to opt in or opt out of having their message data stored by the storing module. Accordingly, users that do not want to have their message data stored can opt out, resulting in the storing module 206 not storing their message data The text classification system 110 generates recommended responses based on a received message and the historical message data stored in the data storage 212. As explained above, the historical message data stored in the data storage 212 includes messages that were transmitted between client devices 102, 104 as part of previous communication sessions, as well as metadata describing the messages, such as the order in which the messages were sent, the originating and destination client devices, etc. The text classification system 110 uses the historical message data to generate a text classification model, which is used to determine recommended responses based on a received message. For example, upon receiving a message from client device 102 that is intended for client device 104 as part of a communication session, the text classification system 110 uses the received message as input in the text classification model, which results in a set of candidate responses to the message. The text classification system 110 then selects a set of recommended responses from the set of candidate response, which can be provided to a user. The functionality of the text classification system 110 is discussed in greater detail below in relation to FIG. 3.

The output module 210 transmits received messages and a set of recommended responses to a recipient user's client device (e.g., client device 104) as part of a communication session. The recipient user can use their client device (e.g., client device 104) to select a recommended response to quickly and easily respond to the received message. For example, the user of client device 104 can provide a single input (e.g., tapping one of the recommended responses) to provide a response to the user of client device 102, rather than typing out a reply message letter by letter and then selecting to send the message. As described above, the messaging system 106, upon receiving a user selection of one of the recommended responses from client device 104, transmits the recommended response to client device 102 as part of the communication session. Additionally, the recommendation generation module may generate and provide client device 102 with a set of recommended responses.

Figure 3:
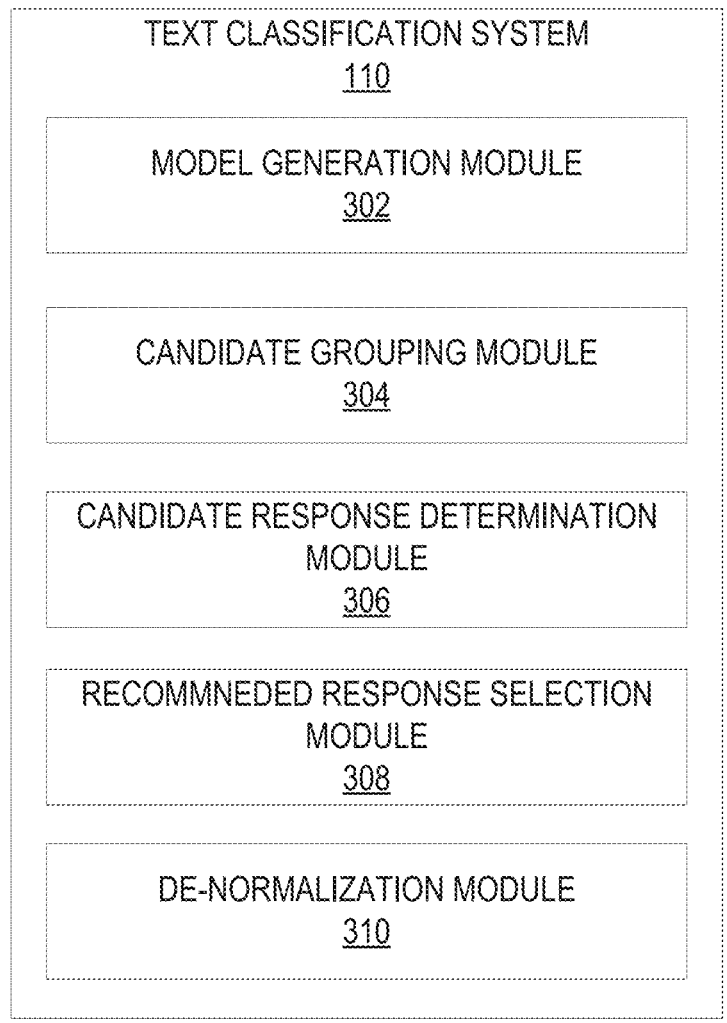
FIG. 3 is a block diagram of the text classification system, according to some example embodiments.

FIG. 3 is a block diagram of the text classification system 110, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the text classification system 110 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the text classification system 110 includes a model generation module 302, a candidate grouping module 304, a candidate response determination module 306, a recommended response selection module 308, and a denormalization module 310.

The model generation module 302 generates a text classification model based on historical message data stored in the data storage 212. Once generated, the text classification model receives as input, a message transmitted as part of a communication session, and returns a set of candidate responses that are commonly used in response to the message. That is, the text classification model analyzes the text of the input message to determine a set of classification labels to assign to the text. The classification labels correspond to candidate responses to the message. The text classification model further provides a determined value of how likely a user is to use the returned candidate response.

To generate the text classification model, the model generation module 302 gathers historical message data from the data storage 212, and identifies the previous messages transmitted during previous communication sessions. The model generation module 302 normalizes each of the previous messages by, for example, replacing personalized terms (e.g., names, addresses, etc.) with placeholders, removing or normalizing punctuation, etc. Normalizing the data in this manner allows the model generation module 302 to identify multiple instances of a unique message. For example, the message "Hi Bob" and "Hi Frank" would both be normalized to "Hi [First Name]," which the model generation module 302 will identify as being two instances of the same message.

After the messages have been normalized, the model generation module 302 identifies a set of the normalized messages that occurred at least a threshold number of times. This provides the model generation module 302 with commonly used responses, which the model generation module 302 designates as a set of available candidate responses that the model generation module 302 can choose from to provide recommended responses to users. That is, the model generation module 302 designates the commonly used responses as classification labels for classifying input messages. Each classification label is associated with an embedding that represents the corresponding candidate response. The model generation module 302 stores the classification labels and their corresponding embeddings in the data storage 212.

To determine the proper context in which to recommend the candidate responses, the model generation module 302 identifies, from the historical message data, messages that preceded each instance of the candidate responses. The model generation module 302 uses these preceding messages along with their corresponding responses to determine embeddings for sets of characters that may be used for input into the text classification model. An embedding is a value, set of values, vector, etc., that represents the set of characters. The embeddings are stored in the data storage 212 and are mapped to their corresponding set of characters.

To reduce resource usage associated with storing the sets of characters and their corresponding embeddings, as well as to anonymize the text, the model generation module 302 hashes the sets of characters and embeddings into hash values. For example, the hash value may be a 64 bit hash value, which reduces the size of the set of characters and associated embedding, while also anonymizing the set of characters. These hash value may be truncated further to a 16 bit hash value. Reducing the size of the hash value to 16 bit may result in collisions, however provides additional benefit in reducing resource usage and increasing anonymity of the text.

The resulting text classification model returns a set of candidate responses from the available candidate responses based on a provided message input. The set of candidate responses is a subset of the available candidate responses that are determined to be commonly used in responses that are the same or similar to the input message. To accomplish this, the text classification model identifies sets of characters in the input message. The set of characters may be of any size. For example, the set of characters may be a set number of concurrent characters in the text, such as two concurrent characters. As another example, the set of characters may be sets of concurrent characters that are separated from other sets of characters by a divider, such as a space, end line, etc. Sets of characters separated by a divider may represent full words in the input text.

The text classification model determines the embeddings mapped to each identified set of characters in the input text. In contrast to previous text classification models that assign equal value to each set of characters (e.g., word) in a text, the text classification model generated by the model generation module 302 uses coefficients to appropriately weight the sets of characters in the input message. The text classification model initially determines an embedding for each set of characters in the text. That is, the text classification model identifies the value, set of values, vector, etc., that is mapped to the set of characters. The text classification model then applies a coefficient to each determined embedding. The coefficient is a value, set of values, vector, etc., that provides a weight to the embedding based on the perceived value of the set of characters to the meaning of the text. For example, common words, such as articles (e.g., a, an, the, etc.), that provide little insight into the meaning of a text are assigned lower coefficients (e.g., below one), whereas words that are relatively rare and may provide greater insight into the meaning of a text are assigned higher coefficients (e.g., greater than one). The coefficient is applied by multiplying the embedding and the coefficient, resulting in a set of weighted coefficients for the text.

The coefficients can be learned by the text classification model, derived from another existing model that measures the significance of each work (e.g. use the norm [length] of the embeddings trained in a Word2Vec model), or derived from a heuristic, such as inverse document frequency. When learned by the text classification model, the coefficients can also be regularized, that is, incorporated into the loss function to discourage text classification model from making them too large or too small, or to encourage sparsity (e.g. L1-regularization), or both.

The text classification model calculates a weighted average embedding for the text based on the set of weighted embeddings and the coefficients. For example, the text classification model calculates the weighted average embedding for the text by dividing the sum of the weighted average embeddings by the sum of the coefficients. The text classification model uses the resulting weighted average embedding for the text to identify classification labels that classify the text.

As explained, the embeddings for each set of characters may be a feature vector that represents its corresponding set of characters. Each feature vector is comprised of a set of vector values for each feature of the vector. The coefficient applied to the vectors may also be a vector including a set of vector values. This allows the coefficient to apply varying weights to the different vector values of the vector based on the corresponding feature. As a result, specific features of the vector may be weighted differently based on their perceived value to properly classifying the text.

The candidate grouping module 304 groups similar candidate responses into candidate groups. Multiple candidate responses may have similar meanings. For example, the terms 'yes,' 'yeah,' 'yup,' 'sure,' etc., all have essentially the same meaning. Providing a user with multiple recommended responses with similar meanings may be redundant and provide the user with limited response options. Accordingly, it is preferable to provide the user with recommended responses that have a variety of meanings. For example, providing the user with recommended responses 'yes,' 'maybe,' and 'no' provides the user with three options that each have a distinct meaning from the others, whereas the recommended responses 'yes,' 'yup,' and 'sure' provide the user with three options that all have a single meaning.

To this end, the candidate grouping module 304 groups each of the candidate response from the available candidate responses into a candidate group based on the meaning of the candidate response. As a result, each candidate response is included in a candidate group with a similar meaning.

The candidate response determination module 306 determines a set of candidate response based on a received message. The received message is a message received as part of a communication session. To accomplish this, the candidate response determination module 306 uses the received message as input in the text classification model generated by the model generation module 302. As explained above, the text classification model returns a set of candidate responses that are commonly used in response to a received message. The set of candidate responses are a subset of the available candidate responses.

In some embodiments, the set of candidate responses returned by the text classification model are ranked based on how likely or commonly each candidate response is used in response to the input message. For example, the text classification model may assign values indicating a percentage value for how likely the candidate response is to be used in response to the input message. The values may be assigned using a multinomial system, in which the sum of all the values assigned to the candidate responses is equal to one. Alternatively, the values may be assigned using a multiclass system, in which the sum of all the values assigned to the candidate responses does not have to equal one.

The recommended response selection module 308 selects a set of recommended responses from the set of candidate responses based on a set of candidate selection rules. The set of candidate selection rules dictate how the set of recommended responses should be selected from the set of candidate responses. For example, the set of candidate selection rules may dictate the number of candidate responses that should be selected as recommended responses, such as 3 candidate responses. As another example, the set of candidate selection rules may dictate that the top rated candidate selection rules be selected. As another example, the set of candidate selection rules may dictate a maximum limit on the number of candidate response that can be selected from a candidate group. For example, the candidate selection rules may dictate that only one candidate response can be selected from each candidate group. This type of candidate selection rule ensures that a user is provided with recommended response with a variety of meanings. In some embodiments, the candidate selection rules can dictate a minimum number of candidate groups from which a candidate response should be picked, such as at least 2 candidate groups. As a result, the recommended responses provided to the user will include at least 2 responses with different meanings.

The de-normalization module 310 de-normalizes recommended responses prior to the recommended response being provided to the user. De-normalizing a recommended response includes replacing a placeholder included in the recommended response with personalized data. For example, a placeholder such as [first name] can be replaced with the recipient user's first name. As another example a placeholder such as [date] can be replaced with the current date. As a result, the recommended messages provided to the user will be personalized based on the communication session and current context (e.g., date, time, etc.).

Figure 4:
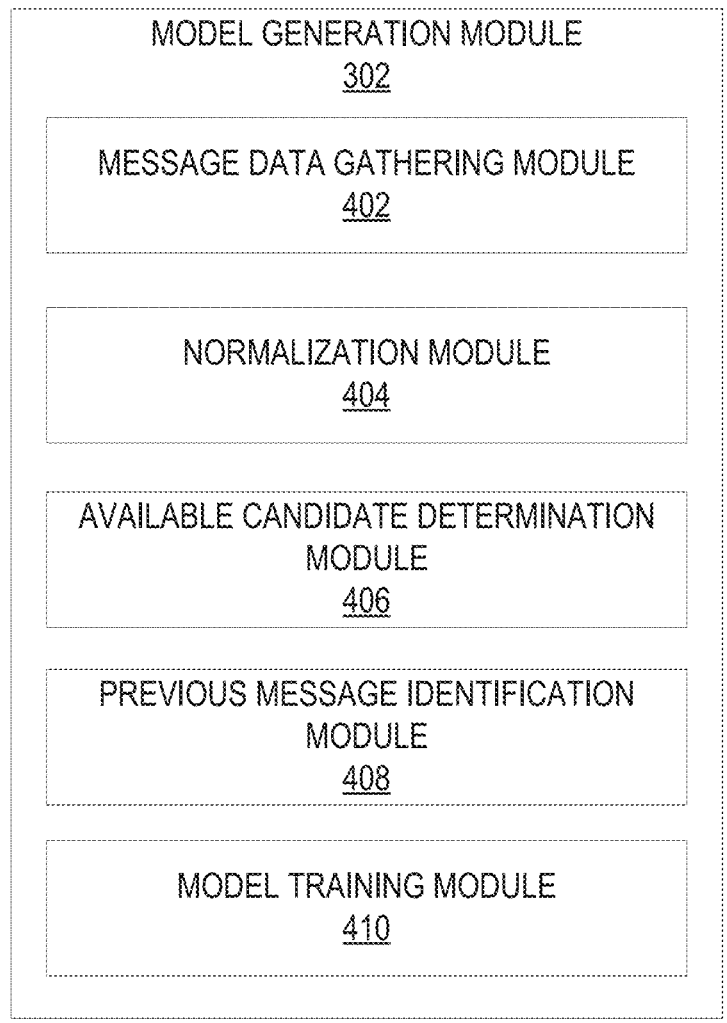
FIG. 4 is a block diagram of the model generation module, according to some example embodiments.

FIG. 4 is a block diagram of the model generation module 302, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the model generation module 302 to facilitate additional functionality that is not specifically described herein. Furthermore, the various functional modules depicted in FIG. 4 may reside on a single computing device or may be distributed across several computing devices in various arrangements such as those used in cloud-based architectures.

As shown, the model generation module 302 includes a message data gathering module 402, a normalization module 404, an available candidate determination module 406, a previous message identification module 408, and a model training module 410. The message data gathering module 402 gathers historical message data from the data storage 212. The historical message data includes messages that were transmitted as part of previous communication sessions, as well as an order in which the messages were transmitted.

The normalization module 404 normalizes the messages from the historical message data. Normalizing the messages may include multiple steps. For example, normalizing the message data includes replacing personalized data with placeholders. Personalized data is data that is unique to the context of the communication session. Examples of personalized data are names, dates, email addresses, addresses, phone numbers, URLs, etc. The normalization module 404 identifies these types of personalized terms on the messages and replaces the terms with placeholders indicating the type of term that was replaced. For example, a user's first name is replaced with a placeholder such as [first name]. Likewise, a date is replaced with a placeholder such as [current date].

In addition to replacing personalized terms with placeholders, the normalization module 404 further normalizes the messages to remove unnecessary characters, spacing, etc. For example, the normalization module 404 removes additional white spaces between words, additional or repeat punctuation, etc.

The available candidate determination module 406 determines the set of available candidate responses that are commonly used by users in communication sessions. To accomplish this, the available candidate determination module 406 determines a number of occurrences of each unique normalized message generated by the normalization module 404. The number of occurrences indicates a number of times that the normalized message was used in communication sessions. The available candidate determination module 406 then compares the number of occurrences that each unique normalized message occurred to a predetermined threshold number of occurrences, such as 1000 occurrences. The available candidate determination module 406 adds each normalized messages that occurred at least the threshold number of times to the set of available candidate responses. As a result, the set of available candidate response only includes responses that were used often or commonly during communication sessions, and messages that were not used commonly are not included in the set of available candidate responses.

The previous message identification module 408 identifies messages that were transmitted preceding each instance (i.e., occurrence) of a candidate message in the historical message data. These preceding messages provide context regarding when and in response what types of messages each candidate response is commonly used. The model training module 410 uses these preceding messages to train the text classification model. That is, the model training module 410 uses the collected data to determine embedding values for the sets of characters as well as for the classification labels (i.e., candidate responses).

Figure 5:
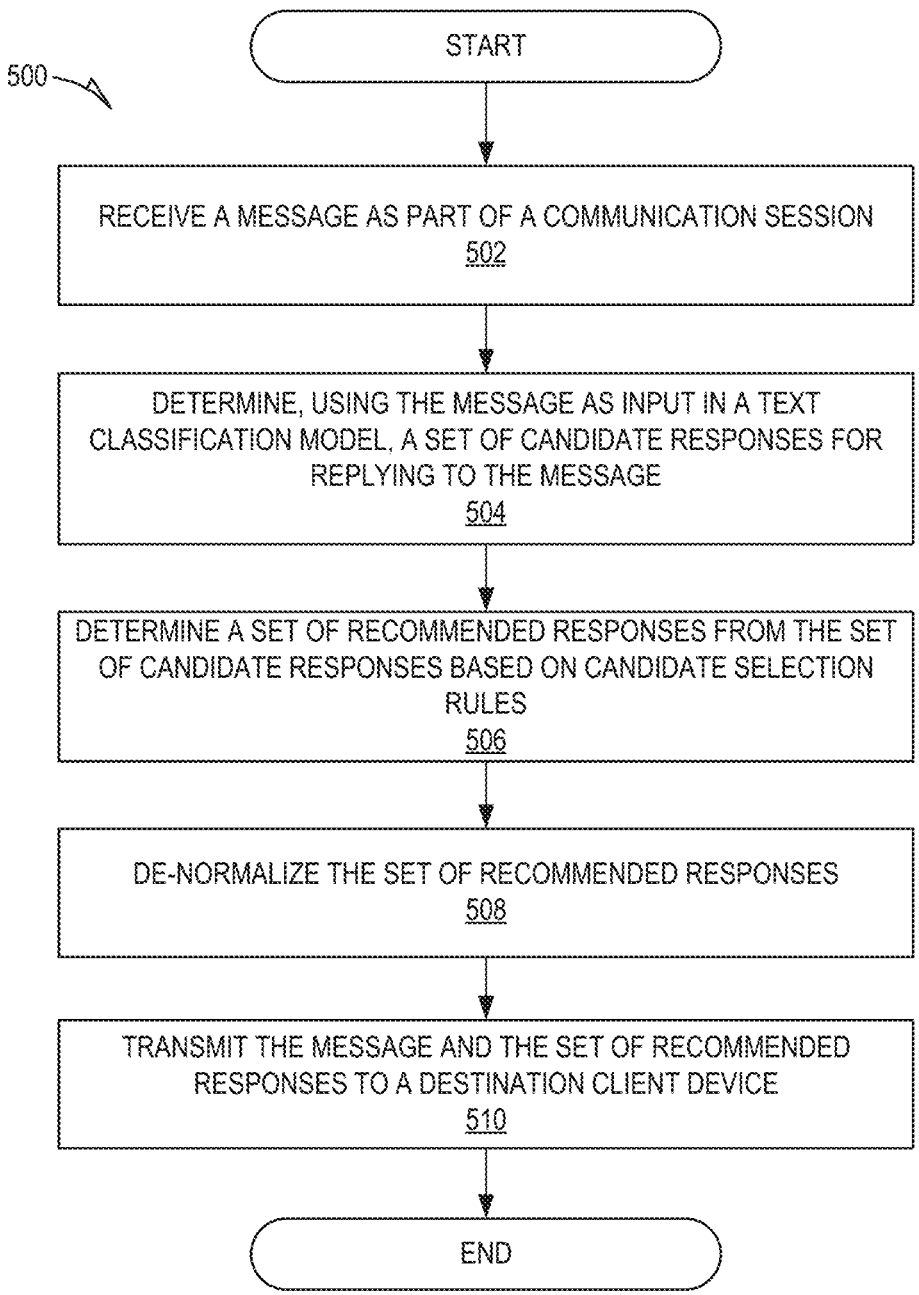
FIG. 5 is a flowchart showing an example method of generating recommended responses using a text classification model, according to certain example embodiments.

FIG. 5 is a flowchart showing an example method 500 of generating recommended responses using a text classification model, according to certain example embodiments. The method 500 may be embodied in computer readable instructions for execution by one or more processors such that the operations of the method 500 may be performed in part or in whole by the messaging system 106, accordingly, the method 500 is described below by way of example with reference thereto. However, it shall be appreciated that at least some of the operations of the method 500 may be deployed on various other hardware configurations and the method 500 is not intended to be limited to the messaging system 106.

At operation 502, the receiving module 204 receives a message as part of a communication session. The messages are received from the client device 102, 104 of an originating user and intended for one or more other client devices 102, 104 of recipient users in the communication session. For example, a user may use the client device 102 to generate and transmit a message to the client device 104 of another user as part of a communication session. The message is initially received by the receiving module 204 of the messaging system 106. The received messages may include metadata, such as a timestamp indicating the time at which the message was transmitted, identifiers identifying the source and/or destination client devices, an identifier identifying the communication session, etc.

At operation 504, the candidate response determination module 306 determines, using the message as input in a text classification model, a set of candidate responses for replying to the message. To accomplish this, the candidate response determination module 306 uses the received message as input in the text classification model generated by the model generation module 302. As explained above, the text classification model returns a set of candidate responses that are commonly used in response to a received message. The set of candidate responses are a subset of the available candidate responses. In some embodiments, the set of candidate responses returned by the text classification model are ranked based on how likely or commonly each candidate response is used in response to the input message.

At operation 506, the recommended response selection module 308 determines a set of recommended responses from the set of candidate responses based on candidate selection rules. The set of candidate selection rules dictate how the set of recommended responses should be selected from the set of candidate responses. For example, the set of candidate selection rules may dictate the number of candidate responses that should be selected as recommended responses, such as 3 candidate responses. As another example, the set of candidate selection rules may dictate that the top rated candidate selection rules be selected. As another example, the set of candidate selection rules may dictate a maximum limit on the number of candidate responses that can be selected from a candidate group. For example, the candidate selection rules may dictate that only one candidate response can be selected from each candidate group. This type of candidate selection rule ensures that a user is provided with recommended responses with a variety of meanings. In some embodiments, the candidate selection rules can dictate a minimum number of candidate groups from which a candidate response should be picked, such as at least 2 candidate groups. As a result, the recommended responses provided to the user will include at least 2 responses with different meanings.

At operation 508, the de-normalization module 310 de-normalizes the set of recommended responses. De-normalizing a recommended responses includes replacing a placeholder included in the recommended response with personalized data. For example, a placeholder such as [first name] can be replaced with the recipient user's first name. As another example a placeholder such as [date] can be replaced with the current date. As a result, the recommended messages provided to the user will be personalized based on the communication session and current context (e.g., date, time, etc.)

At operation 510, the output module 210 transmits the message and the set of recommended responses to a destination client device. The recipient user can use their client device (e.g., client device 104) to select a recommend response to quickly and easily respond to the received message. For example, the user of client device 104 can provide a single input (e.g., tapping one of the recommended responses) provide a response to the user of client device 102, rather than typing out a reply message letter by letter and then selecting to send the message.

Figure 6:
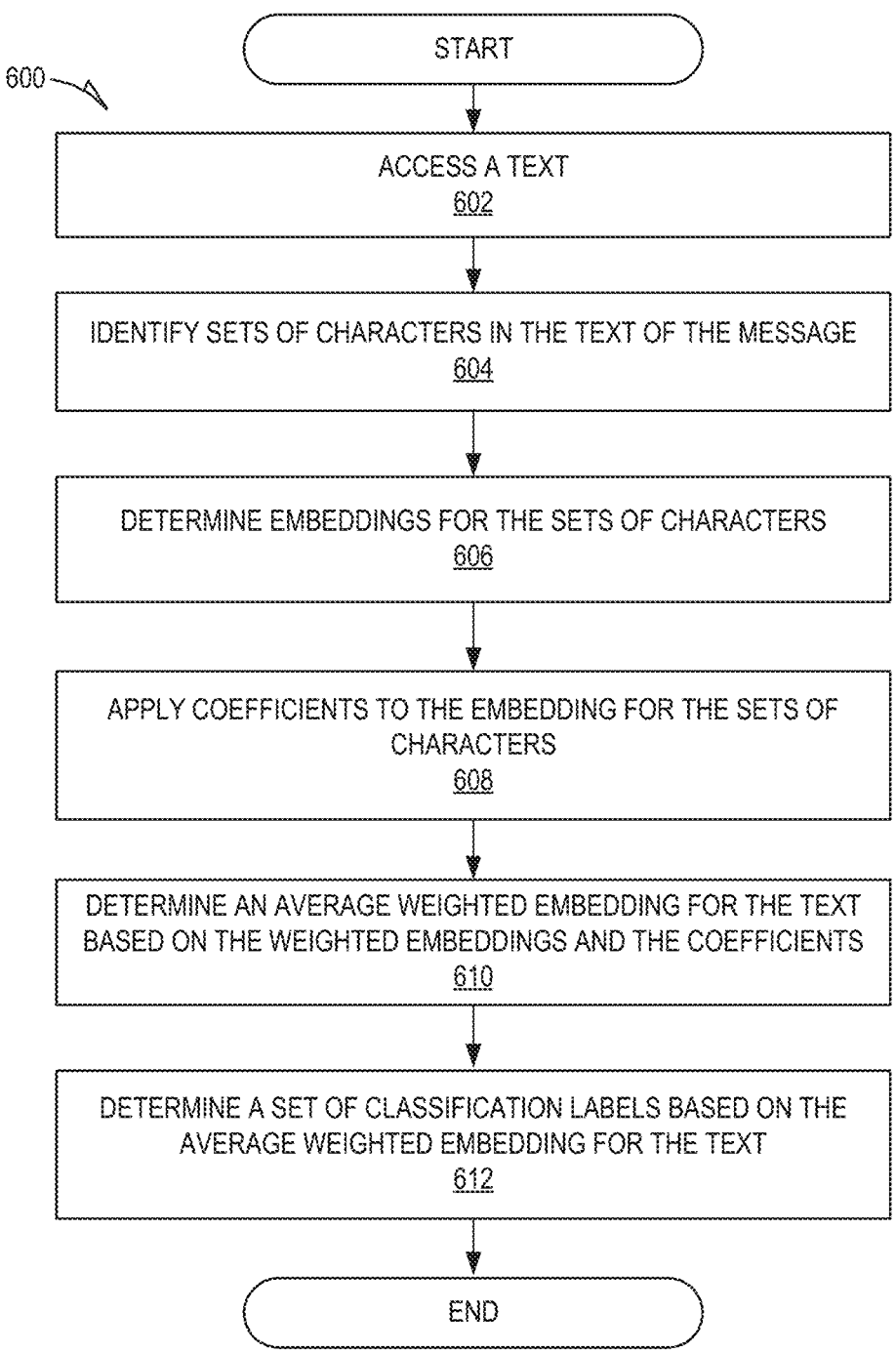
FIG. 6 is a flowchart showing an example method of applying coefficients to embeddings in an improved text classification model, according to certain example embodiments.

FIG. 6 is a flowchart showing an example method 600 of applying coefficients to embeddings in an improved text classification model, according to certain example embodiments. The method 600 may be embodied in computer readable instructions for execution by one or more processors such that the operations of the method 600 may be performed in part or in whole by a text classification system (e.g., text classification system 110); accordingly, the method 600 is described below by way of example with reference thereto. However, it shall be appreciated that at least some of the operations of the method 600 may be deployed on various other hardware configurations and the method 600 is not intended to be limited to a text classification system.

At operation 602, the text classification system accesses a text. The text may be any type of text consisting of sets of characters. For example, the text may be a message transmitted from one user to another user as part of a communication session.

At operation 604, the text classification system identifies set of characters in the text of the message. The set of characters may be of any size. For example, the set of characters may be a set number of concurrent characters in the text, such as two concurrent characters. As another example, the set of characters may be sets of concurrent characters that are separated from other sets of characters by a divider, such as a space, end line, etc. Sets of characters separated by a divider may represent full words in the input text.

At operation 606, the text classification system determines embeddings for the sets of characters. Each set of characters is mapped to a stored embedding. An embedding (i.e., word embedding) is a value, set of values, vector, etc., that is mapped to a set of characters. The embedding represents its corresponding set of characters.

The embeddings are stored in a data storage and mapped to their corresponding sets of characters. The text classification system searches the data storage based on the sets of characters identified in the text to identify their corresponding embedding. In some embodiments, the sets of characters stored in the data storage have been hashed to anonymize the data, as well as to reduce the size of the stored data. That is hash values generated based on the sets of characters are stored in the data storage and mapped to the embeddings. In this type of embodiment, the text classification system hashes the sets of characters from the text and then searches the data storage based on the resulting hash values.

At operation 608, the text classification system applies coefficients to the embeddings for the sets of characters. The text classification system applies a coefficient to each determined embedding. The coefficient is a value, set of values, vector, etc., that provides a weight to the embedding based on the perceived value of the set of characters to the meaning of the text. For example, common words, such as articles (e.g., a, an, the, etc.), that provide little insight into the meaning of a text are assigned lower coefficients (e.g., below one), whereas words that are relatively rare and may provide greater insight into the meaning of a text are assigned higher coefficients (e.g., greater than one). The text classification system applies the coefficient by multiplying the embedding and the coefficient, resulting in a set of weighted coefficients for the text.

The coefficients can be learned by the text classification model, derived from another existing model that measures the significance of each work (e.g. use the norm [length] of the embeddings trained in a Word2Vec model), or derived from a heuristic, such as inverse document frequency. When learned by the text classification model, the coefficients can also be regularized, that is, incorporated into the loss function to discourage text classification model from making them too large or too small, or to encourage sparsity (e.g. L1-regularization), or both.

As explained, the embeddings for each set of characters may be a feature vector that represents its corresponding set of characters. Each feature vector is comprised of a set of vector values for each feature of the vector. The coefficient applied to the vectors may also be a vector including a set of vector values. This allows the coefficient to apply varying weights to the different vector values of the vector based on the corresponding feature. As a result, specific features of the vector may be weighted differently based on their perceived value to properly classifying the text.

At operation 610, the text classification system determines an average weighted embedding for the text based on the weighted embeddings and the coefficients. For example, the text classification system calculates the weighted average embedding for the text by dividing the sum of the weighted average embeddings by the sum of the coefficients. In embodiments in which the embedding and the coefficients are both vectors, the weighted average embedding for the text is also a vector. The text classification system calculates each vector value if the weighted average embedding for the text by dividing the sum of the corresponding vector values of the weighted average embeddings by the sum of the corresponding vector values of the coefficients.

At operation 612, the text classification system determines a set of classification labels based on the average weighted embedding for the text. The classification labels are associated with an embedding. For each classification label, the text classification system determines a dot product of the weighted average embedding for the text and the embedding for the respective classification label. The resulting output indicates a likelihood that the classification label fits the text. Accordingly, the text classification system selects the classification labels that resulted in the highest output.

Figure 7:
FIG. 7 is a screenshot of a messaging interface including a set of recommended response messages, according to some example embodiments.

FIG. 7 is a screenshot of a messaging interface 700 including a set of recommended response messages, according to some example embodiments. As shown, the messaging interface shows a history of messages transmitted between multiple users as part of a communication session. As shown, the most recent message received as part of the communication session is the phrase 'Thank you.' The messaging interface includes a text field 702, which a user can utilize to respond to the received message. For example, the user can select the text field 702 and enter a response such as 'you're welcome.' The messaging interface also includes a set of three recommended replies 704, which a user can select from. As shown, the recommended replies 704 include a thumbs up emoticon, 'Welcome,' and 'You are welcome.' Rather than use the text field 702 to manually type out a response, the user can select one of the recommended replies 704 with a single input to respond to the message.

Software Architecture

Figure 8:
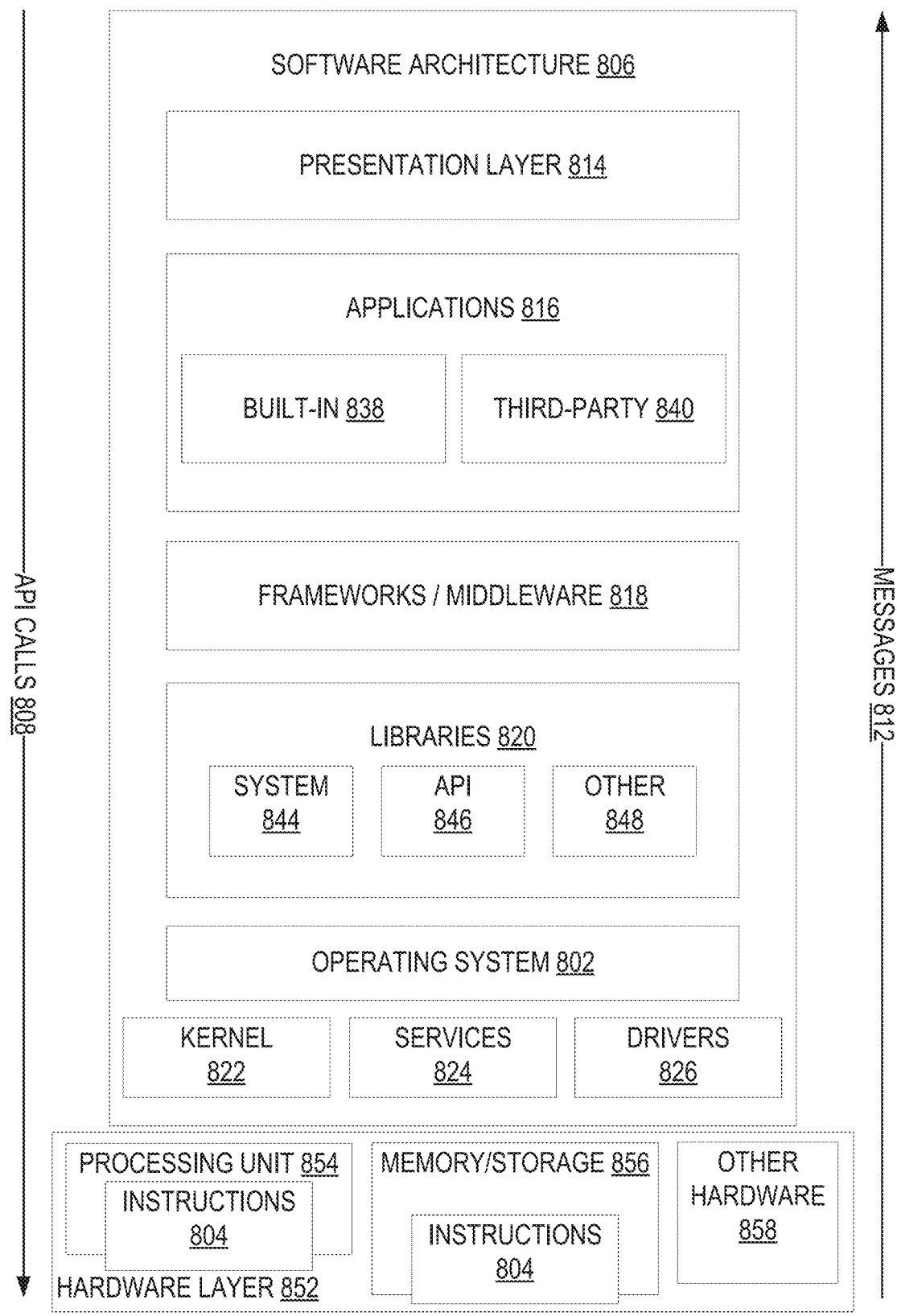
FIG. 8 is a block diagram illustrating an example software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input-output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions kernel 822, services 824 and/or drivers 826), libraries 820, and frameworks/middleware 818 to create user interfaces to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
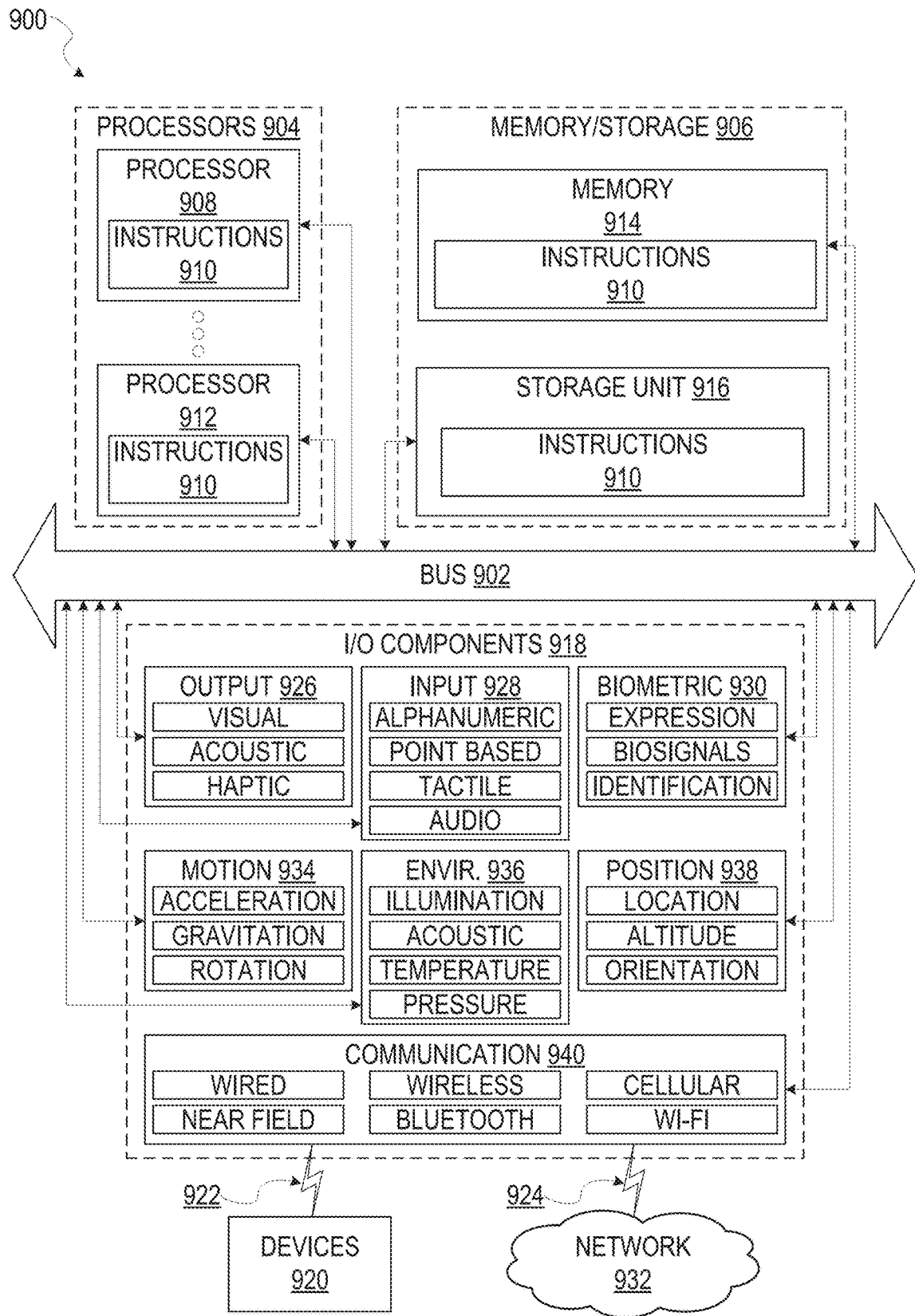
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device 102, 104 may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components.

Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 904 (sometimes referred to as "cores") that may execute instructions 910 contemporaneously.

What is claimed is:
1. A method comprising:
for each respective set of characters from a group of multiple sets of characters:
generating an embedding value representing the respective set of characters,
generating, using a hashing algorithm, a hash value representing the respective set of characters, the hash value being smaller in size than the respective set of characters, and
mapping the embedding value representing the respective set of characters to the embedding value representing the respective set of characters, yielding a set of saved hash values mapped to a set of embedding values;
accessing a text comprising a first set of characters and a second set of characters;
generating, using the hashing algorithm, a first hash value representing the first set of characters and a second hash value representing the second set of characters;
comparing the first hash value to the set of saved hash values, yielding a first comparison;
determining, based on the first comparison, that the first hash value matches a first saved hash value from the set of saved hash values;
determining that a first embedding value mapped to the first saved hash value represents the first set of characters;
comparing the second hash value to the set of saved hash values, yielding a second comparison;
determining, based on the second comparison, that the second hash value matches a second saved hash value from the set of saved hash values;

determining that a second embedding value mapped to the second saved hash value represents the second set of characters;

applying a first coefficient to the first embedding value and a second coefficient to the second embedding value, yielding a first weighted embedding value and a second weighted embedding value, the first coefficient being different than the second coefficient;

determining a weighted average embedding value for the text based on the first weighted embedding value, the second weighted embedding value, the first coefficient and the second coefficient; and identifying at least a first classification label and a second classification label for the text based on the weighted average embedding value for the text.

2. The method of claim 1, wherein applying the first coefficient to the first embedding value comprises multiplying the first coefficient to the first embedding value, yielding the first weighted embedding value.

3. The method of claim 1, wherein determining the weighted average embedding value for the text comprises:
adding the first weighted embedding value to the second weighted embedding value, yielding a summed weighted embedding value;
adding the first coefficient to the second coefficient, yielding a summed coefficient value; and
dividing the summed weighted embedding value by the summed coefficient value, yielding the weighted average embedding value for the text.

4. The method of claim 3, wherein applying the first coefficient to the first embedding value comprises:
multiplying a first vector value of the first embedding value to a first vector value of the first coefficient; and
multiplying a second vector value of the first embedding value to a second vector value of the first coefficient, the first vector value of the first coefficient being different than the second vector value of the first coefficient.

5. The method of claim 4, wherein determining the weighted average embedding value for the text comprises:
adding a first vector value of the first weighted embedding value to a first vector value of the second weighted embedding value, yielding a first vector value of a summed weighted embedding value;
adding a second vector value of the first weighted embedding value to a second vector value of the second weighted embedding value, yielding a second vector value of the summed weighted embedding value;
adding a first vector value of the first coefficient to a first vector value of the second coefficient, yielding a first vector value of a summed coefficient;
adding a second vector value of the first coefficient to a second vector value of the second coefficient, yielding a second vector value of the summed coefficient;
dividing the first vector value of the summed weighted embedding value by the first vector value of the summed coefficient, yielding a first vector value of the weighted average embedding value for the text; and
dividing the second vector value of the summed weighted embedding value by the second vector value of the summed coefficient, yielding a second vector value of the weighted average embedding value for the text.

6. The method of claim 1, wherein the first embedding value, the second embedding value, the first coefficient and the second coefficient are vectors.

7. The method of claim 1, further comprising:
determining a first probability value indicating an estimated likelihood that the first classification label properly categorizes the text; and
determining a second probability value indicating an estimated likelihood that the second classification label properly categorizes the text, a sum of the first probability value and the second probability value being greater than one.

8. A system comprising:
one or more computer processors; and
one or more computer-readable mediums storing instructions that, when executed by the one or more computer processors, cause the system to perform operations comprising:
for each respective set of characters from a group of multiple sets of characters:
generating an embedding value representing the respective set of characters,
generating, using a hashing algorithm, a hash value representing the respective set of characters, the hash value being smaller in size than the respective set of characters, and
mapping the embedding value representing the respective set of characters to the embedding value representing the respective set of characters, yielding a set of saved hash values mapped to a set of embedding values;
accessing a text comprising a first set of characters and a second set of characters;
generating, using the hashing algorithm, a first hash value representing the first set of characters and a second hash value representing the second set of characters;
comparing the first hash value to the set of saved hash values, yielding a first comparison;
determining, based on the first comparison, that the first hash value matches a first saved hash value from the set of saved hash values;
determining that a first embedding value mapped to the first saved hash value represents the first set of characters;
comparing the second hash value to the set of saved hash values, yielding a second comparison;
determining, based on the second comparison, that the second hash value matches a second saved hash value from the set of saved hash values;
determining that a second embedding value mapped to the second saved hash value represents the second set of characters;
applying a first coefficient to the first embedding value and a second coefficient to the second embedding value, yielding a first weighted embedding value and a second weighted embedding value, the first coefficient being different than the second coefficient;
determining a weighted average embedding value for the text based on the first weighted embedding value, the second weighted embedding value, the first coefficient and the second coefficient; and
identifying at least a first classification label and a second classification label for the text based on the weighted average embedding value for the text.

9. The system of claim 8, wherein applying the first coefficient to the first embedding value comprises multiplying the first coefficient to the first embedding value, yielding the first weighted embedding value.

10. The system of claim 8, wherein determining the weighted average embedding value for the text comprises:

adding the first weighted embedding value to the second weighted embedding value, yielding a summed weighted embedding value;
adding the first coefficient to the second coefficient, yielding a summed coefficient value; and
dividing the summed weighted embedding value by the summed coefficient value, yielding the weighted average embedding value for the text.

11. The system of claim 8, wherein the first embedding value, the second embedding value, the first coefficient and the second coefficient are vectors.

12. The system of claim 11, wherein applying the first coefficient to the first embedding value comprises:
multiplying a first vector value of the first embedding value to a first vector value of the first coefficient; and
multiplying a second vector value of the first embedding value to a second vector value of the first coefficient, the first vector value of the first coefficient being different than the second vector value of the first coefficient.

13. The system of claim 12, wherein determining the weighted average embedding value for the text comprises:
adding a first vector value of the first weighted embedding value to a first vector value of the second weighted embedding value, yielding a first vector value of a summed weighted embedding value;
adding a second vector value of the first weighted embedding value to a second vector value of the second weighted embedding value, yielding a second vector value of the summed weighted embedding value;
adding a first vector value of the first coefficient to a first vector value of the second coefficient, yielding a first vector value of a summed coefficient;
adding a second vector value of the first coefficient to a second vector value of the second coefficient, yielding a second vector value of the summed coefficient;
dividing the first vector value of the summed weighted embedding value by the first vector value of the summed coefficient, yielding a first vector value of the weighted average embedding value for the text; and
dividing the second vector value of the summed weighted embedding value by the second vector value of the summed coefficient, yielding a second vector value of the weighted average embedding value for the text.

14. The system of claim 8, the operations further comprising:
determining a first probability value indicating an estimated likelihood that the first classification label properly categorizes the text; and
determining a second probability value indicating an estimated likelihood that the second classification label properly categorizes the text, a sum of the first probability value and the second probability value being greater than one.

15. A non-transitory computer-readable medium storing instructions that, when executed by one or more computer processors of a computing device, cause the computing device to perform operations comprising:
for each respective set of characters from a group of multiple sets of characters:
generating an embedding value representing the respective set of characters,
generating, using a hashing algorithm, a hash value representing the respective set of characters, the hash value being smaller in size than the respective set of characters, and
mapping the embedding value representing the respective set of characters to the embedding value representing the respective set of characters, yielding a set of saved hash values mapped to a set of embedding values;
accessing a text comprising a first set of characters and a second set of characters;
generating, using the hashing algorithm, a first hash value representing the first set of characters and a second hash value representing the second set of characters;
comparing the first hash value to the set of saved hash values, yielding a first comparison;
determining, based on the first comparison, that the first hash value matches a first saved hash value from the set of saved hash values;
determining that a first embedding value mapped to the first saved hash value represents the first set of characters;
comparing the second hash value to the set of saved hash values, yielding a second comparison;
determining, based on the second comparison, that the second hash value matches a second saved hash value from the set of saved hash values;
determining that a second embedding value mapped to the second saved hash value represents the second set of characters;
applying a first coefficient to the first embedding value and a second coefficient to the second embedding value, yielding a first weighted embedding value and a second weighted embedding value, the first coefficient being different than the second coefficient;
determining a weighted average embedding value for the text based on the first weighted embedding value, the second weighted embedding value, the first coefficient and the second coefficient; and
identifying at least a first classification label and a second classification label for the text based on the weighted average embedding value for the text.

16. The non-transitory computer-readable medium of claim 15, wherein applying the first coefficient to the first embedding value comprises multiplying the first coefficient to the first embedding value, yielding the first weighted embedding value.

17. The non-transitory computer-readable medium of claim 15, wherein determining the weighted average embedding value for the text comprises:
adding the first weighted embedding value to the second weighted embedding value, yielding a summed weighted embedding value;
adding the first coefficient to the second coefficient, yielding a summed coefficient value; and
dividing the summed weighted embedding value by the summed coefficient value, yielding the weighted average embedding value for the text.

18. The non-transitory computer-readable medium of claim 17, wherein applying the first coefficient to the first embedding value comprises:
multiplying a first vector value of the first embedding value to a first vector value of the first coefficient; and
multiplying a second vector value of the first embedding value to a second vector value of the first coefficient, the first vector value of the first coefficient being different than the second vector value of the first coefficient.

19. The non-transitory computer-readable medium of claim 18, wherein determining the weighted average embedding value for the text comprises:

adding a first vector value of the first weighted embedding value to a first vector value of the second weighted embedding value, yielding a first vector value of a summed weighted embedding value;

adding a second vector value of the first weighted embedding value to a second vector value of the second weighted embedding value, yielding a second vector value of the summed weighted embedding value;

adding a first vector value of the first coefficient to a first vector value of the second coefficient, yielding a first vector value of a summed coefficient;

adding a second vector value of the first coefficient to a second vector value of the second coefficient, yielding a second vector value of the summed coefficient;

dividing the first vector value of the summed weighted embedding value by the first vector value of the summed coefficient, yielding a first vector value of the weighted average embedding value for the text; and dividing the second vector value of the summed weighted embedding value by the second vector value of the summed coefficient, yielding a second vector value of the weighted average embedding value for the text.

20. The non-transitory computer-readable medium of claim 15, wherein the first embedding value, the second embedding value, the first coefficient and the second coefficient are vectors.

* * * * *